Figures 1, 2:
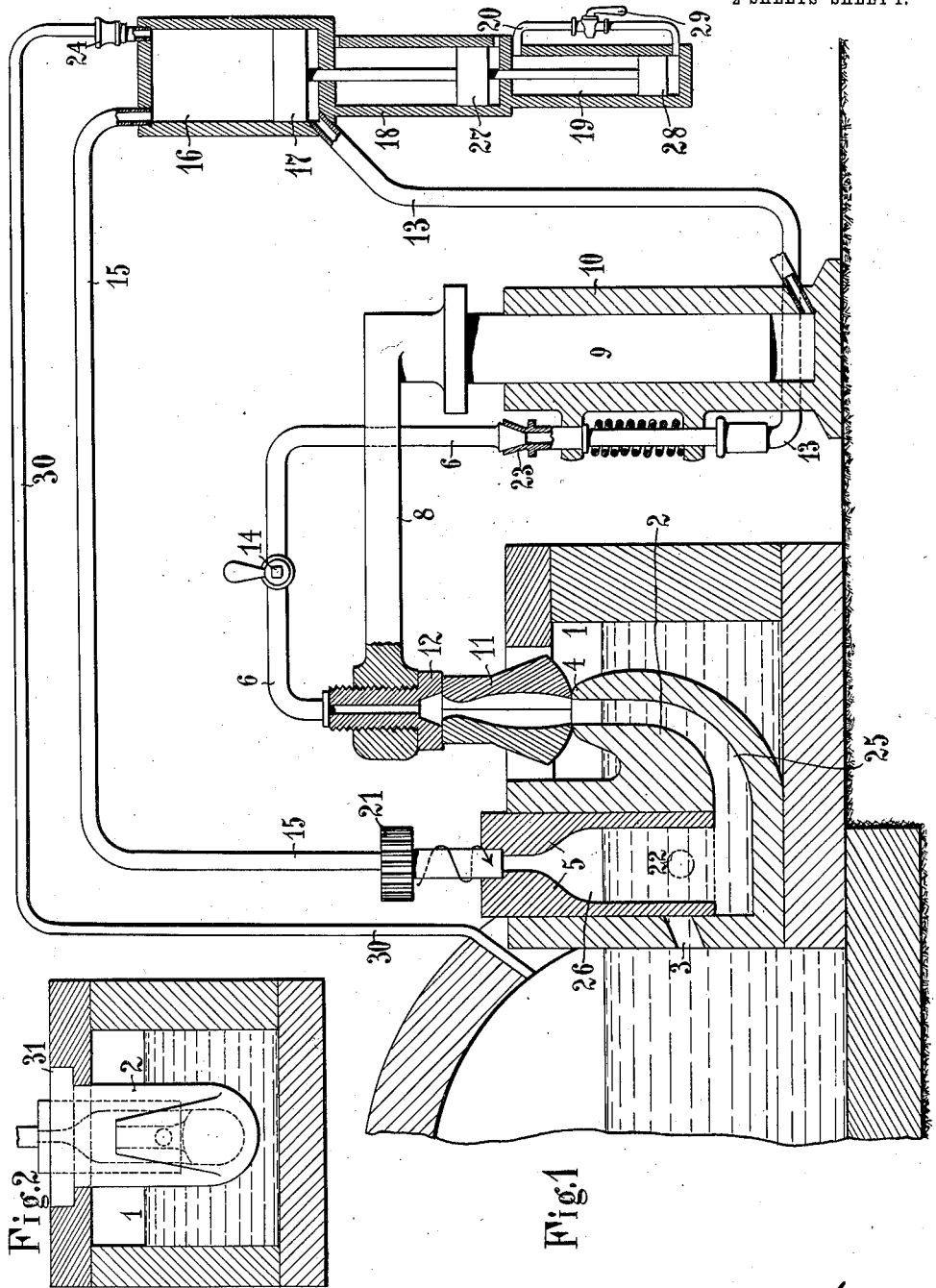

H. SEVERIN.
DEVICE FOR EXTRACTING MEASURED QUANTITIES OF GLASS FROM SMELTING FURNACES.
APPLICATION FILED SEPT. 1, 1910.

984,974.

Patented Feb. 21, 1911.

2 SHEETS—SHEET 1.

Witnesses,

Inventor.
Heinrich Severin.
By
Atty.

H. SEVERIN.
DEVICE FOR EXTRACTING MEASURED QUANTITIES OF GLASS FROM SMELTING FURNACES.
APPLICATION FILED SEPT. 1, 1910.
984,974.
Patented Feb. 21, 1911.
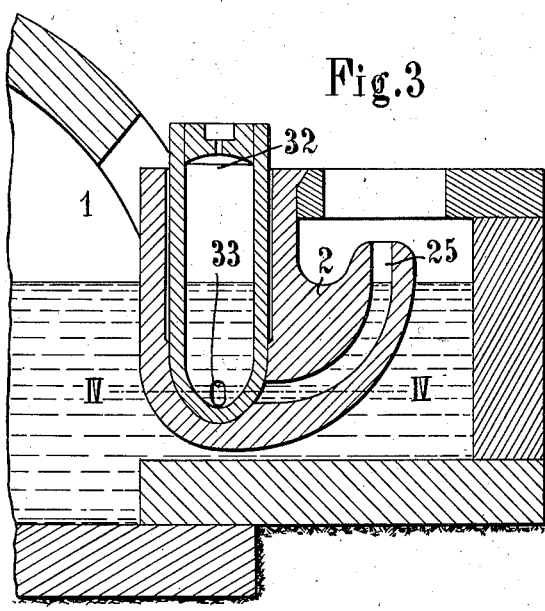
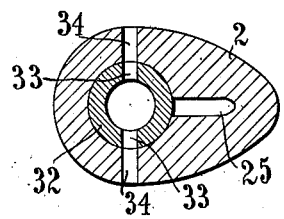
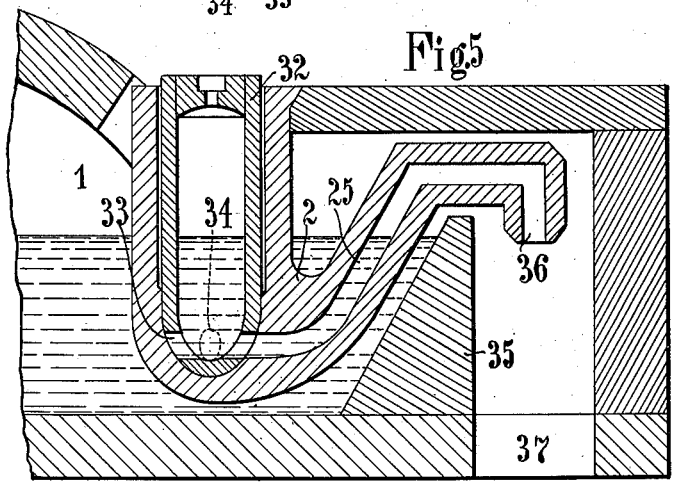

UNITED STATES PATENT OFFICE.

HEINRICH SEVERIN, OF SASBACH, NEAR ACHERN, GERMANY.

DEVICE FOR EXTRACTING MEASURED QUANTITIES OF GLASS FROM SMELTING-FURNACES.

984,974.  Specification of Letters Patent.  Patented Feb. 21, 1911.

Application filed September 1, 1910. Serial No. 580,061.

*To all whom it may concern:*

Be it known that I, HEINRICH SEVERIN, of Sasbach, near Achern, in the Grand Duchy of Baden, in the German Empire, have invented certain new and useful Improvements in Devices for Extracting Measured Quantities of Glass from Smelting-Furnaces.

The present invention relates to a device by means of which glass may be extracted from a smelting furnace in given quantities in order to be used for further manipulation, and it has reference in particular to such devices as consist of an intermediate receptacle or vessel which is located in the furnace or an extension thereof, this intermediate receptacle being provided with glass inlet and outlet openings and with a device whereby the glass can be pressed out of the intermediate receptacle. For this purpose either a pressure block or compressed air can be used, the pressure block being raised and lowered in a correspondingly formed chamber of the intermediate receptacle.

The arrangement of the intermediate receptacle according to this present invention is such that a rotary hollow cylinder can be used instead of a piston or pressure block which is raised and lowered. This hollow cylinder is provided with inlet and outlet openings, which can be brought into registration with the inlet and outlet openings of the intermediate receptacle according to whether it is desired that the glass should be fed from the furnace to the hollow cylinder or pressed from the hollow cylinder into position for further manipulation.

The intermediate receptacle can be located either on the bottom of the furnace or the extended portion of same and the hollow cylinder can be open underneath and be in constant communication with the glass outlet opening, or the said intermediate receptacle can be suspended from the roof of the furnace in the molten mass and the hollow cylinder can be closed underneath so that it only comes periodically in communication with the outlet opening of the intermediate receptacle.

According to the purpose for which the glass is to be manipulated, the mouth of the intermediate receptacle can be directed upward, and over said mouth an opening can be made in the roof of the furnace which can be closed by a plate. Through this opening the preliminary or filling mold can be introduced into the furnace and be placed on the mouth of the intermediate receptacle. The outlet pipe of the intermediate receptacle can also have its mouth directed downward in case the mold is introduced into the furnace from below or in case it has to be brought before an opening provided in the bottom. In this case the glass flows from the mouth of the rising or outlet pipe of the intermediate receptacle by gravity to the mold.

Although the intermediate receptacle will be generally arranged to be mounted in the furnace in such way that it can be taken out, and the mold to be filled will accordingly be moved to the mouth of the intermediate receptacle, the arrangement could be such, for instance, that the preliminary or filling mold is not located so as to be raised and lowered, but rotating on arms on a horizontal plane, the intermediate receptacle being raised and lowered, so that after the preliminary mold has been brought into position over the mouth of the intermediate receptacle, the latter is raised until the mouth of its rising passage engages with the under edge of the preliminary or filling mold.

In order to reduce the time necessary for extracting the glass from the furnace, the preliminary or filling mold can be connected with an arrangement whereby a vacuum can be created. It is thus possible to get the glass into the preliminary or filling mold in two ways, that is, by the pressing arrangement or by suction of the air out of the preliminary mold, or both ways can be applied. It will be clear that, in the latter case, the time required for filling the glass into the preliminary mold is considerably reduced and the mold is less exposed to the gases of high temperature of the furnace and the mold is thereby rendered more durable.

A further advantage consists in the considerable reduction of time necessary for making single objects such as bottles, and in the correspondingly increased capacity of the machine.

The invention is shown in the accompanying drawings in several suitable forms, in which—

Figure 1 is a vertical section through that part of the furnace which comes into question, and the arrangement serving to extract the glass. Fig. 2 shows a modification of the intermediate receptacle which in this case does not rest on the bottom of the furnace, but is suspended from above. Fig. 3 shows a further modification of the intermediate receptacle in vertical section. Fig. 4 is a section on line IV—IV of Fig. 3. Fig. 5 shows a modification in section of the intermediate receptacle in which the glass outlet opening is not directed upward but downward.

The device consists of the usual receptacle 2 of fire-resisting material which is placed in an extension of the furnace 1 with an inlet port 3 for the glass and a rising outlet pipe 25, the mouth of which is designated by 4. In the hollow space 26 of the receptacle 2, the hollow cylinder 5 is so suspended that it can be rotated by ratchet gear 21 to the extent of 90° at a time. The hollow cylinder is provided with perforations at two places diametrically opposite each other and which are alternately brought into registration with the inlet port 3. By means of the pipe 15 which is in communication with the hollow cylinder 5, the interior of the cylinder can be filled with compressed air.

The machine for forming the hollow glass bodies is placed before the furnace in the usual way and consists, in the construction shown, of the cylinder 10 in which a vertical shaft 9 is so located that it can be raised, lowered and rotated. On an arm 8 keyed to the shaft 9 is a preliminary mold 11 of two parts which are closed by the head-mold 12 which is likewise fastened to the arm 8. A suction pipe 6 is coupled to the head-mold in the usual way and is provided with a stop-cock 14.

By means of this arrangement the method of producing hollow glass bodies resolves itself into the following:—During the interval between the making of two bottles, the hollow cylinder 5 is so rotated that one of its perforations 22 comes into registration with the inlet port 3 and the glass enters into the cylinder 5. If the preliminary mold 11 of the machine is now lowered on to the mouth 4 of the outlet passage 25 for the purpose of being filled, the cylinder 5 is simultaneously rotated to the extend of 90° in the position shown. The mold can now be filled in two ways:—

(1) By compressed air being fed into the interior of the cylinder 5 through the pipe 15. The perforations 22 of the cylinder being closed in this position, the glass has no other course but to pass from below into the outlet passage 25 and to pass through its mouth 4 into the mold. The passage of the glass can, however, be made easier and be accelerated by—

(2) Opening the cock 14 of the suction pipe 6 and creating a vacuum. The glass is thus made to enter the mold both under the influence of the pressure of the compressed air and of the vacuum created in the head-mold and the preliminary mold.

For obtaining both the pressure and the vacuum, one and the same arrangement is preferably used as will now be explained with reference to the drawings:—

In the cylinder 16 is the plunger 17 the connecting rod of which is extended so as to carry two further plungers 27 and 28 in supplementary cylinders 18 and 19. The cylinder 18 is in communication with a conduit for compressed air (not shown) so that, on reversing, the air can enter either above or below the plunger 27 and thus cause the plunger 17 in the cylinder 16 to be raised or lowered. The cylinder 19 is supposed to be a retarding cylinder filled with glycerin, its action being regulated by a cock 29 in the pipe 20 through which the flow is reversed at each stroke of the piston.

The cylinder 16 acts over the plunger 17 at first as a pressure pump, the pressure being conducted to the hollow space of the cylinder 5 through the pipe 15, but below the plunger it acts as a vacuum pump by means of its connection with the suction pipe 13, said pipe 13 ending in a spring controlled packing collar 23 which receives the adjacent end of the suction pipe 6 when the vertical shaft 9 is lowered and the filling mold 11 is placed on the mouth of the outlet passage 25.

If the mold 11 is to be filled, the plunger 17 is raised by the upward movement of the plunger 27, so as to create the necessary superpressure in the hollow space of the cylinder 5 and also to create simultaneously a vacuum in the preliminary mold and head-mold. The succeeding downward stroke of the plunger 17 to its starting position, as shown, will have the effect of accelerating the entry of the glass in the cylinder 5 by suction.

The amount of the suction is regulated to the required degree by means of a back-pressure valve 24 attached to the cylinder 16, as the glass might otherwise be easily sucked up into pipe 15 where it would congeal and interrupt the communication. It is preferable to allow the air passing through the back-pressure valve to come through a pipe 30 direct from the hot furnace in order to avoid cold air entering the hollow cylinder when the glass is being pressed out, as it would cause cracks in the glass.

The intermediate receptacle shown in Fig. 2 differs from that shown in Fig. 1 in that it is not placed on the bottom of the furnace, but is suspended from the roof of same. For this purpose it is provided with a flange 31 at its upper end by means of which it can rest on the edge of the opening of the furnace.

The further modified forms of intermediate receptacle, shown in Figs. 3-5 are also suspended in the furnace in the same manner as the form shown in Fig. 2, but they differ in that the hollow cylinder 32 is closed on all sides. At its lower end the cylinder 32 is provided with two openings 33 which are alternately brought into registration with the glass inlet openings 34 and the glass outlet opening 25 in the intermediate receptacle 2, as is clearly shown in Fig. 4.

While the arrangements shown in Figs. 1-4 are suitable for the production of bottles, the arrangement shown in Fig. 5 can be used with advantage for producing plate glass or wide-necked hollow glass bodies. This arrangement only differs from those previously described in that the glass outlet passage 25 of the intermediate receptacle 2 is provided with a downwardly directed mouth 36 which extends toward an opening 37 in the bottom of the furnace under which opening the intermediate mold serving to receive the molten glass to be manipulated is brought. For inclosing the furnace a block 35 of chamotte is used.

Having now particularly described and ascertained the nature of my said invention, and in what manner the same is to be performed, I declare that what I claim, is:

1. The combination, with a glass melting furnace; of a receptacle for the molten glass having an inlet in communication therewith, and an outlet, said outlet being arranged to discharge into a mold; a hollow cylinder rotatably fitted in said receptacle and provided with an inlet; means for rotating said cylinder to bring the second-named inlet into and out of registration with the first named inlet; and means for causing the glass to flow through said outlet into the mold.

2. The combination, with a glass melting furnace; of a receptacle for the molten glass having an inlet in communication therewith, and an outlet, said outlet being arranged to discharge into a mold; a hollow cylinder rotatably fitted in said receptacle and provided with an inlet; means for rotating said cylinder to bring the second-named inlet into and out of registration with the first-named inlet; and means for subjecting the glass in said receptacle to a suction influence, to cause it to flow through said outlet into the mold.

3. The combination, with a glass melting furnace; of a receptacle for the molten glass having an inlet in communication therewith, and an outlet, said outlet being arranged to discharge into a mold; a hollow cylinder rotatably fitted in said receptacle and provided with an inlet; means for rotating said cylinder to bring the second-named inlet into and out of registration with the first-named inlet; and means for subjecting the glass in said receptacle to the simultaneous influence of suction and positive pressure, to cause it to flow through said outlet into the mold.

4. The combination, with a glass melting furnace; of a receptacle for the molten glass having an inlet in communication therewith, and an outlet; and means for discharging the glass through said outlet under the simultaneous influence of suction and positive pressure.

5. The combination, with a glass melting furnace; of a receptacle for the molten glass having an inlet in communication therewith, and an extended outlet passage; means for subjecting the glass in said receptacle to the action of positive pressure, to force it to flow through said passage; and additional means for creating a vacuum at the mouth of said passage.

6. The combination, with a glass melting furnace; of a receptacle for the molten glass having an inlet in communication therewith, and means for subjecting the glass in said receptacle to the influence of positive pressure, to force it to flow through said outlet; and means for creating a vacuum at said outlet, to accelerate such flow.

7. The combination, with a glass melting furnace; of a receptacle for the molten glass having an inlet in communication therewith, and an outlet; means for applying a positive downward pressure upon the glass in said receptacle, to force it to flow through said outlet; and additional means for accelerating the flow of glass through said outlet.

8. The combination, with a glass melting furnace; of a receptacle for the molten glass having an inlet in communication therewith, and an outlet; a pump including a cylinder and a plunger movable therein; a pipe connection between said receptacle and said cylinder on one side of said plunger, for supplying air under pressure to said receptacle; and a pipe connection between the outlet of said receptacle and said cylinder on the opposite side of said plunger, for creating a vacuum at said outlet.

9. The combination, with a glass melting furnace; of a receptacle for the molten glass having an inlet in communication therewith, and an outlet; a hollow cylinder rotatably fitted in said receptacle and provided with an inlet; means for rotating said cylinder, to bring the second-named inlet into and out of registration with the first-named inlet; and means communicating with said cylinder for supplying air under pressure to the interior thereof, to force the glass in said receptacle to flow through said outlet.

10. The combination, with a glass melting furnace; of a receptacle for the molten glass having an inlet in communication therewith, and an outlet; a hollow cylinder rotatably fitted in said receptacle and provided with an inlet; means for rotating said cylinder, to bring the second-named inlet into and out of registration with the first-named inlet; means communicating with said cylinder for supplying air under pressure to the interior thereof, to force the glass in said receptacle to flow through said outlet; and means for accelerating the flow of glass through said outlet.

11. The combination, with a glass melting furnace; of a receptacle for the molten glass having an inlet in communication therewith and an outlet; a hollow cylinder rotatably fitted in said receptacle and provided with an inlet; means for rotating said cylinder, to bring the second-named inlet into and out of registration with the first-named inlet; means communicating with said cylinder for supplying air under pressure to the interior thereof, to force the glass in said receptacle to flow through said outlet; and means for creating a vacuum at said outlet, to accelerate such flow.

12. The combination, with a glass melting furnace; of a receptacle for the molten glass having an inlet in communication therewith, and an outlet; a hollow cylinder rotatably fitted in said receptacle and provided with an inlet; means for rotating said cylinder, to bring the second-named inlet into and out of registration with the first-named inlet; a pump; and a pipe connection between said pump and said cylinder, for supplying air under pressure to the interior of the latter, to force the glass in said receptacle to flow through said outlet.

13. The combination, with a glass melting furnace; of a receptacle for the molten glass having an inlet in communication therewith, and an outlet; a hollow cylinder rotatably fitted in said receptacle and provided with an inlet; means for rotating said cylinder, to bring the second-named inlet into and out of registration with the first-named inlet; a pump; a pipe connection between said pump and said cylinder, for supplying air under pressure to the interior of the latter, to force the glass in said receptacle to flow through said outlet; and an additional pipe connection between said pump and said outlet for creating a vacuum at said outlet, to accelerate such flow.

In testimony whereof I have hereunto set my hand in presence of two subscribing witnesses.

HEINRICH SEVERIN.

Witnesses:
AUGUST OOSTERMAN,
MARIA HERTTIG.